United States Patent
Choi et al.

(10) Patent No.: US 8,436,975 B2
(45) Date of Patent: May 7, 2013

(54) ROLL STOCKER AND METHOD FOR FABRICATING LIQUID CRYSTAL DISPLAY DEVICE USING THE SAME

(75) Inventors: Byoung Chul Choi, Gyeonggi-Do (KR); Jung Seung Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 352 days.

(21) Appl. No.: 12/461,299

(22) Filed: Aug. 6, 2009

(65) Prior Publication Data
US 2009/0294386 A1 Dec. 3, 2009

Related U.S. Application Data

(62) Division of application No. 11/477,819, filed on Jun. 30, 2006, now Pat. No. 7,583,352.

(30) Foreign Application Priority Data

Dec. 29, 2005 (KR) .............................. 2005-134392

(51) Int. Cl.
*G02F 1/13* (2006.01)
(52) U.S. Cl.
USPC ........................................................ 349/187
(58) Field of Classification Search ................ 414/911; 349/187
See application file for complete search history.

(56) References Cited

U.S. PATENT DOCUMENTS

| | | | | |
|---|---|---|---|---|
| 6,648,043 | B1 * | 11/2003 | Kundinger et al. | 156/499 |
| 6,782,933 | B2 * | 8/2004 | Marschke | 156/472 |
| 7,089,985 | B1 * | 8/2006 | Kundinger et al. | 156/499 |
| 7,450,213 | B2 | 11/2008 | Kim | |
| 2003/0223030 | A1 | 12/2003 | Byun et al. | |

FOREIGN PATENT DOCUMENTS

| | | |
|---|---|---|
| JP | 2004-122067 | 4/2004 |
| TW | 409190 | 10/2000 |
| TW | 241449 | 10/2005 |

* cited by examiner

*Primary Examiner* — Uyen Chau N Le
*Assistant Examiner* — John M Bedtelyon
(74) *Attorney, Agent, or Firm* — McKenna Long & Aldridge LLP

(57) ABSTRACT

A roll stocker includes a plurality of roll fixing units for fixing a plurality of rubbing rolls; shaft connection parts having a plurality of radially extended end portions connected with each roll fixing unit; and a rotational shaft for fixing the center of the shaft connection parts and rotating the shaft connection parts. A plurality of rubbing rolls can be rotated, and by keeping the plurality of rubbing rolls in storage in the closed roll stocker, contamination of a rubbing cloth due to external particles can be prevented, space utilization can be enhanced, and deviation of eccentricity of the rubbing rolls kept in storage can be prevented.

9 Claims, 7 Drawing Sheets

ROLL STOCKER AND METHOD FOR FABRICATING LIQUID CRYSTAL DISPLAY DEVICE USING THE SAME

CROSS-REFERENCE TO RELATED APPLICATIONS

This application is a Divisional of application Ser. No. 11/477,819 filed Jun. 30, 2006, now U.S. Pat. No. 7,583,352 now allowed; which claims the benefit of the Korean Patent Application No. P2005-134392, filed on Dec. 29, 2005, both of which is are hereby incorporated by reference for all purposes as if fully set forth herein. This application incorporates by reference application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS", now U.S. Pat. No. 7,295,279, granted Nov. 13, 2007; and application serial number 11/476,919, filed on Jun. 29, 2006, entitled "METHODS OF MANUFACTURING LIQUID CRYSTAL DISPLAY DEVICES", now U.S. Pat. No. 7,450,213, granted Nov. 11, 2008 for all purposes as if fully set forth herein.

BACKGROUND OF THE INVENTION

1. Field of the Invention

The present invention relates to a roller stocker and a method for fabricating a liquid crystal display (LCD) device and, more particularly, to roll stocker capable of corresponding to various models of mother substrates and keeping a sufficient number of rubbing rolls for securing a margin for roll operation, and a fabrication method of a liquid crystal display (LCD) device using the same.

2. Description of the Related Art

As demand for information displays and for portable (mobile) information devices grows, research and commercialization of light and thin flat panel displays ("FPD") has increased. Flat panel displays are increasingly replacing the Cathode Ray Tube ("CRT"), as the most common display device.

The liquid crystal display ("LCD") device is a FPD device to display images using the optical anisotropy of liquid crystal. LCD devices exhibit excellent resolution and color and picture quality, so it is widely applied for notebook computers or desktop monitors, and the like.

In the LCD device, a data signal containing image information is separately supplied to liquid crystal cells arranged in a matrix form, and light transmittance of the liquid crystal cells is controlled to display the desired image.

FIG. 1 is an exploded perspective view illustrating the structure of a LCD device.

As illustrated in FIG. 1, the LCD device includes a color filter substrate 5, namely, a first substrate, an array substrate 10, namely, a second substrate, and a liquid crystal layer 40 formed between the color filter substrate 5 and the array substrate 10.

The color filter substrate 5 includes a color filter (C) comprising sub-color filters 7 for implementing red (R), green (G) and blue (B) color, a black matrix 6 for discriminating the sub-color filters 7 and blocking light transmitting through the liquid crystal layer 40, and a transparent common electrode 8 for applying a voltage to the liquid crystal layer 40.

The array substrate 10 includes gate lines 16 and data lines 17 which are arranged on the substrate 10 and define pixel regions (P). A thin film transistor (TFT), a switching element, is formed at respective crossings of the gate lines 16 and the data lines 17, and a pixel electrode 18 is formed at each pixel region (P).

The pixel region (P) is a sub-pixel corresponding to one sub-color filter 7 of the color filter substrate 5, and a color image is obtained by combining three types of red, green and blue sub-color filters 7. Namely, the three red, green and blue sub-pixels form one pixel, and the TFTs are connected with the blue, green and blue sub-pixels.

An alignment film (not illustrated) for aligning liquid crystal molecules of the liquid crystal layer 40 is formed on the color filter substrate 5 and the array substrate 10.

FIG. 2 illustrates a method for forming an alignment film using a roll printing method.

As illustrated, generally, an alignment film is formed using a printing method using a plurality of rolls. Namely, an alignment solution 24 supplied between a cylindrical anylox roll 22 and a cylindrical doctor roll 23 is uniformly coated entirely on the anylox roll 22 as the anylox roll 22 and the doctor roll 23 are rotated. In this case, the alignment solution 24 is supplied by a dispenser 1 in an injector type.

The anylox roll 22 is rotated in contact with a printing roll 24 having a rubber plate 25 attached on a certain region of its surface, and the alignment solution 24 on the anylox roll 22 is transferred to the rubber plate 25. The rubber plate 25 corresponds to a substrate 26 on which the alignment solution 24 is to be coated, and has a master pattern to allow the alignment film to be selectively printed on the substrate 26.

As a printing table 27 with the substrate 26 loaded thereon is moved in contact with the printing roll 24, the alignment solution 24 which has been transferred to the rubber plate 25 is re-transferred onto the substrate 26 to thereby form an alignment film.

Next, with the alignment film formed on the substrate, the alignment film is rubbed to arrange liquid crystals in a certain direction to form valleys in a certain direction.

FIG. 3 is a perspective view illustrating a rubbing process.

As illustrated, the alignment film 21 is rubbed to form the recesses 36 on the surface thereof. The rubbing process refers to rubbing the surface of the alignment film 21 in a certain direction using a roller 30 with a rubbing cloth 35 wound thereon.

When the surface of the alignment film 21 is rubbed, it has fine recesses 36.

As the rubbing cloth 35, a soft cloth is used, and rubbing equipment including the roller 30 is relatively simple. The basic part for setting conditions for the rubbing process is setting a rubbing condition with a suitable strength and applying a uniform rubbing strength on a large area.

If the rubbing is not uniformly performed, an alignment degree of liquid crystal molecules is not spatially uniform, causing a defect that optical characteristics are different at a certain portion of the panel.

In addition, since the physical units such as the rolls are used in the rubbing process, management of the rolls is important with respect to stability of processes. Accordingly, it is important to secure the sufficient number of rubbing rolls to obtain a margin in operating rolls. However, there is no means for storing the rubbing rolls, and the rubbing rolls are kept standing in a vertical direction, limiting to operation of rolls. In addition, as the size of a mother substrate for fabricating a liquid crystal display panel is increased, the rubbing roll is lengthened, so there is a limitation to keep the rubbing roll in a standing state in a limited clean room.

In addition, since the rubbing rolls are kept in a fixed state, eccentricity of the rubbing roll is deviated. The eccentric of the rubbing roll is critical factor for managing a rubbing process together with a state of a rubbing cloth.

Moreover, since the rubbing rolls are kept in the opened state, the rubbing cloth is inevitably contaminated by external particles, to cause damage to the surface of the liquid crystal display panel.

BRIEF DESCRIPTION OF THE INVENTION

Therefore, one aspect of the present invention involves the recognition by the present inventors of the drawbacks in the related art as explained above. In order to address such problems, the present invention provides a roll stocker capable of coping with a variety of models of mother substrates and keeping the sufficient number of rubbing rolls in storage within a minimum space to obtain a margin in operating rolls and a method for fabricating a liquid crystal display (LCD) device.

Another aspect of the present invention provides a roll stocker capable of preventing deviation of eccentricity of rubbing rolls kept in storage by rotating the plurality of rubbing rolls at one time, and a method for fabricating an LCD device.

Still another aspect of the present invention provides a roll stocker capable of preventing contamination of a rubbing cloth by keeping rubbing rolls in storage in a closed state, and a method for fabricating an LCD device.

One feature of the present invention is to provide a roll stocker including: a plurality of roll fixing units for fixing a plurality of rubbing rolls; shaft connection parts having a plurality of radially extended end portions connected with each roll fixing unit; and a rotational shaft for fixing the center of the shaft connection parts and rotating the shaft connection parts.

Another feature of the present invention is to provide a method for fabricating an LCD device including: providing mother substrates each having a plurality of array substrates or a plurality of color filter substrates formed thereon; performing an array process on the array substrates and performing a color filter process on the color filter substrates; forming an alignment film on a surface of the mother substrate; performing rubbing on the mother substrate with the alignment film formed thereon; taking out a required rubbing roll from a roll stocker, which includes a plurality of roll fixing units for fixing a plurality of rubbing rolls, a shaft connection part having a plurality of radially extended end portions connected with each roll fixing unit, and a rotational shaft for fixing the center of the shaft connection part to rotating the shaft connection part, as necessary, and continuously performing a rubbing process; attaching the pair of rubbing process-finished mother substrates; and cutting the attached mother substrates into a plurality of unit liquid crystal display panels.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The roll stocker and a method for fabricating an LCD device in accordance with the illustrated embodiments of the present invention will be described with reference to the accompanying drawings.

Figure 1:
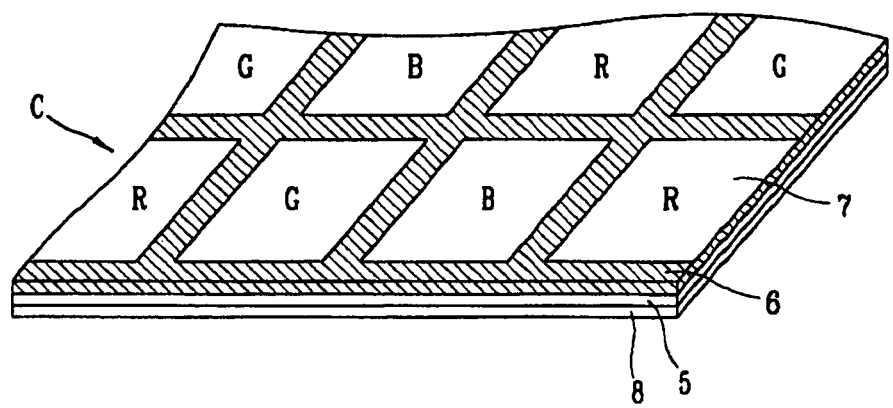
FIG. 1 is an exploded perspective view illustrating the structure of a LCD device.
Figure 1:
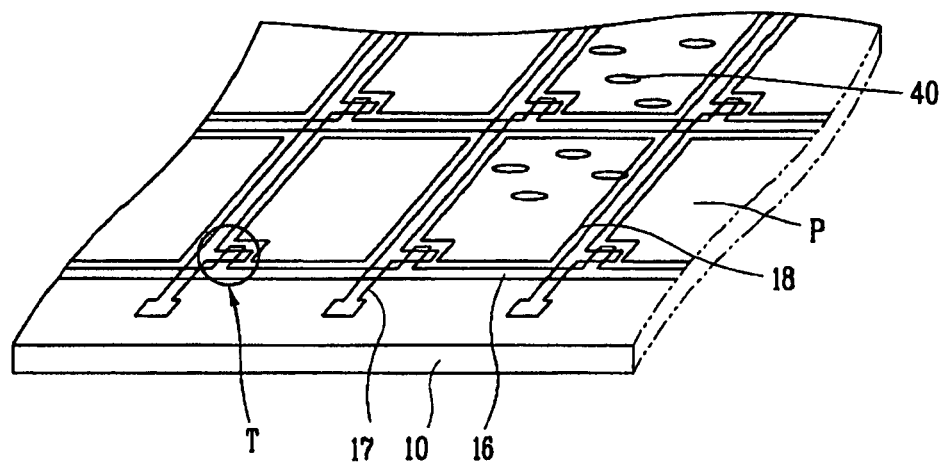
Figure 2:
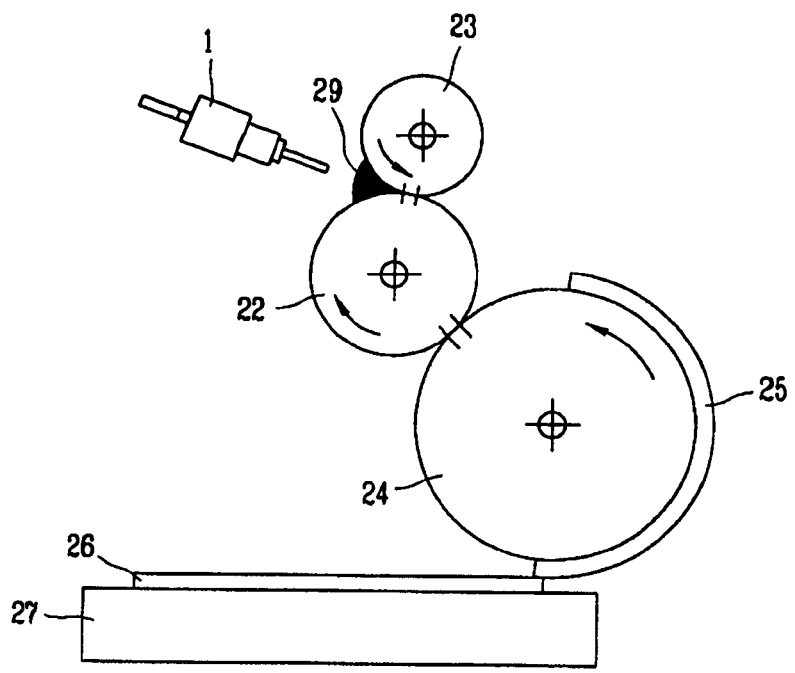
FIG. 2 is a view illustrating a method for forming an alignment film using a roll printing method.
Figure 3:
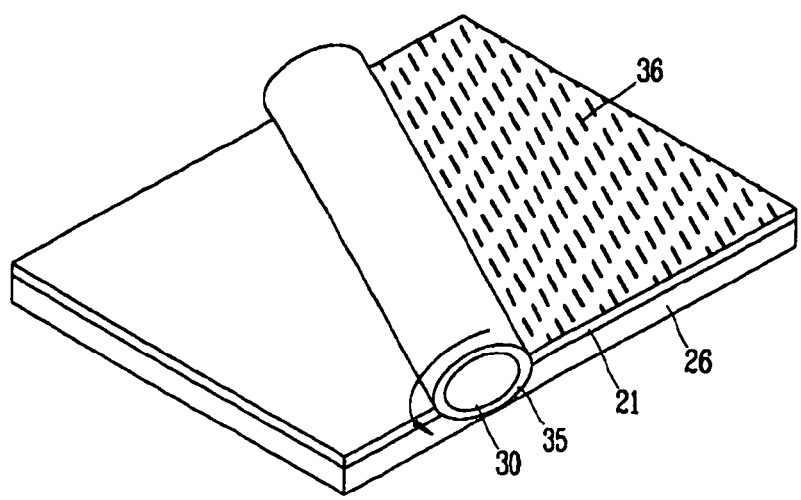
FIG. 3 is a perspective view illustrating a rubbing process.
Figure 4:
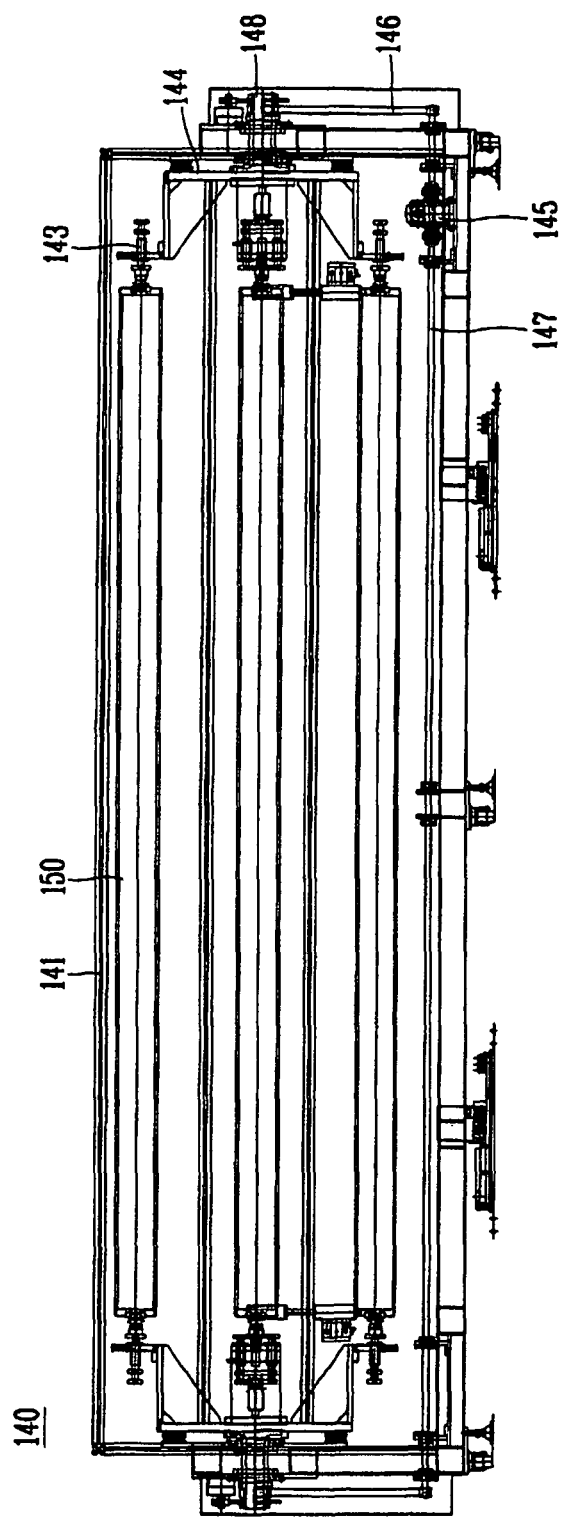
FIG. 4 is an exemplary view illustrating a roll stocker in accordance with the present invention.
Figure 5:
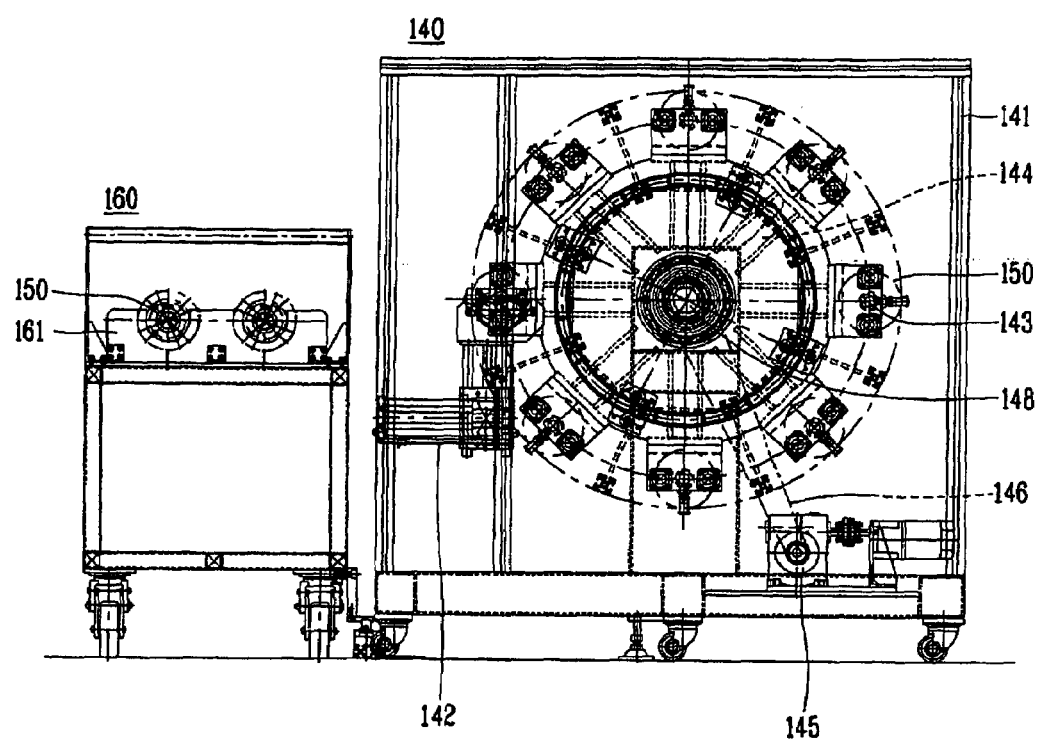
FIG. 5 illustrates the roll stocker in FIG. 4 viewed from the side.

FIGS. 4 and 5 are exemplary views illustrating a roll stocker in accordance with the present invention. Specifically, FIG. 4 is a front view of the roll stocker for keeping rubbing rolls, and FIG. 5 is a side view of the roll stocker in FIG. 4.

As illustrated, a roll stocker 140 is a turn type roll stocker that is rotatable to keep the sufficient number of rubbing rolls 150 in the same space.

That is, a plurality of rubbing rolls 150 are kept in the roll stocker 140 with both ends thereof inserted in the pair of left and right roll fixing units 143, and in this case, each end of the plurality of pairs of roll fixing units 143 are connected with each radially extending end of shaft connection part 144. The center of the shaft connection part 144 is fixed at a rotational shaft 148, so that when the rotational shaft 148 is rotated, the plurality of rubbing rolls 150 kept in the plurality of pairs of roll fixing units 143 can be rotated all at once.

Illustrated on the drawing is that eight rubbing rolls 150 are fixed to be kept in storage in the eight pairs of roll fixing units 143 connected with the end of the shaft connection parts 144, but the present invention is not limited thereto and can be applied to a case where the plurality of rubbing rolls 150 are fixed to be kept in storage in the plurality of pairs of the roll fixing units 143 connected at the end of the shaft connection parts 144 separated at the same angles.

The roll stocker 140 includes an outer frame 141 so as to be closed from outside to prevent contamination of the rubbing rolls 150 due to external particles.

The rubbing rolls 150 are kept with both ends thereof inserted in the pair of roll fixing units 143 in a horizontal direction in the roll stocker 140, and a motor 145 for rotating the rotational shaft 148 is installed at a lower side of the roll stocker 140 to prevent sagging of the rubbing rolls 150 kept in storage in the horizontal direction. Namely, the rubbing rolls 150 are stored horizontally with their end portions inserted in the pair of roll fixing units 143, and by periodically rotating the rotational shaft 148, sagging of the rubbing rolls 150 can be prevented, thereby preventing any deviation in the eccentricity of the rubbing rolls 150.

Because the roll stocker 140 stores the plurality of rubbing rolls 150 in the plurality pairs of roll fixing units 143, and because the plurality pairs of the roll fixing units 143 are connected with the pair of rotational shafts 148 through the shaft connection parts 144, the plurality of rubbing rolls 150 kept in storage can be entirely rotated at one time according to a rotation of the rotational shaft 148. Compared with the driving method in which the rubbing rolls are separately rotated, the number of driving units such as a driving motor can be reduced, which is advantageous in terms of cost and simplifies the fabrication of the roll stocker.

The power of the motor 145 is transferred through a shaft 147 and a driving transmission unit. The shaft 147 is a bar-type mechanical component that transfers power to a portion at some distance away based on either rotational movement or linear reciprocal movement. Power transferred from the shaft 147 is transferred to the rotational shaft 148 installed at the side frame 141 of the roll stocker 140 through a belt 146. Thereafter, the shaft connection parts 144 with the center fixed at the rotational shaft 148 are rotated according to driving of the motor 145, and accordingly, the roll fixing units 143 connected with the end portion of the shaft connection parts 144 and the rubbing rolls 150 are rotated overall.

In this case, in this embodiment of the present invention, periodical rotating of the roll stocker 140 is required to not only prevent sagging of the rubbing rolls 150 but also take the rubbing roll 150 out of the roll stocker 140. Thus, in order to keep the rubbing rolls 150 in the roll stocker 140 or take the rubbing roll out of the roll stocker 140, the roll stocker 140 includes a roll entrance 142 for allowing the rubbing rolls 150 to be received and taken out. When the rubbing roll 150 is placed at the roll entrance 142, the rotational shaft 148 and the plurality pairs of roll fixing units 143 are rotated so that a pair of left and right empty roll fixing units 143 can be directed to the roll entrance 142 automatically or manually. Thereafter, the pair of roll fixing units 143 are pulled in both outward directions, the rubbing roll 150 is positioned there between, the pair of roll fixing units 143 return to their original positions, thereby fixing both ends of the rubbing roll 150 so as to be kept in storage.

Meanwhile, in order to take a required rubbing roll 150, among the rubbing rolls 150 in storage, out of the roll stocker 140, first, the rotational shaft 148 and the plurality of pairs of roll fixing units 143 are rotated so that the required rubbing roll 150 can be positioned toward the roll entrance 142. Thereafter, the pair of roll fixing units 143 positioned at both ends of the rubbing roll 150 and fixing the rubbing rolls 150 are pulled in both outward directions, and then, the required rubbing roll 150 is taken out through the roll entrance 142.

As stated above, as the size of the rubbing roll 150 increases, the importance of management of the rubbing roll 150 increases, and a sufficient number of rubbing rolls 150 should be kept in storage to maintain stability and predictability in the manufacturing process. In addition, when a mother substrate for fabricating a liquid crystal display panel of a different model is introduced to the rubbing line, a different type rubbing roll should be used that corresponds to the model of the liquid crystal display panel, and accordingly, the sufficient number of rubbing rolls 150 must be secured according to the various models. In this case, the sufficient number of rubbing rolls 150 of various types is kept in the turn type roll stocker 140 to obtain a margin in operating rolls and thus contribute to process stability.

For reference, reference numeral 160 denotes a roll moving unit for transferring the rubbing roll 150 between the roll stocker 140 and a certain rubbing line, and a roll keeping unit 161 for keeping the rubbing rolls 150 in storage is installed in the roll moving unit 160.

A method for fabricating an LCD device using the roll stocker constructed as described above will be explained in detail with reference to the accompanying drawings.

Figure 6:
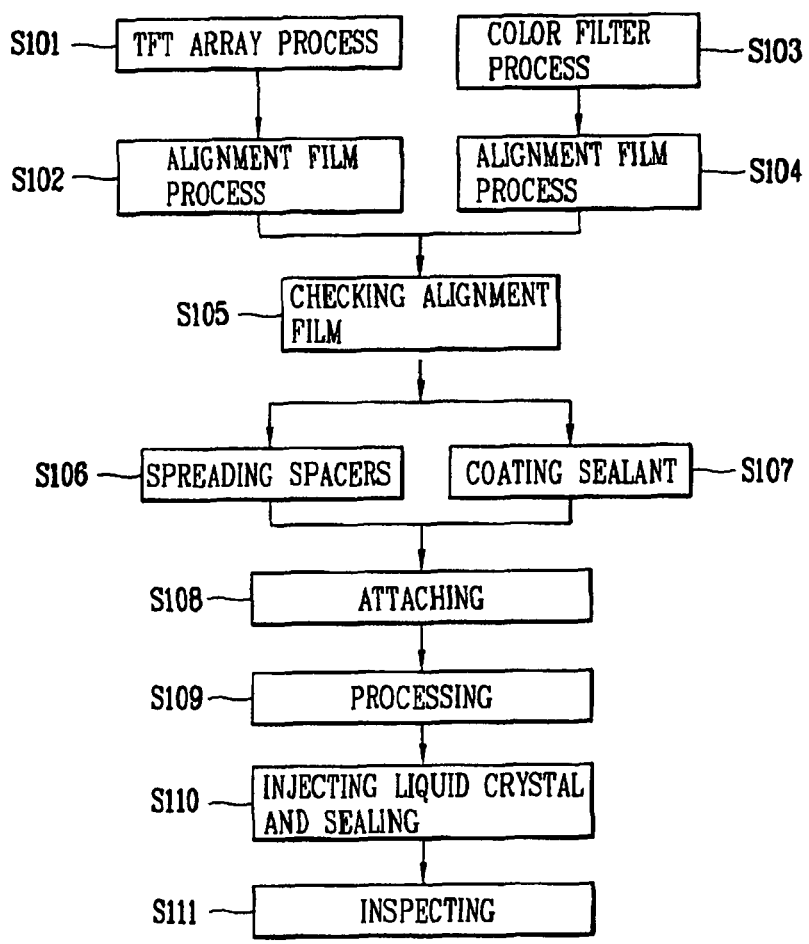
FIG. 6 is a flow chart illustrating the processes of one method for fabricating a liquid crystal display panel in accordance with the present invention.
Figure 7:
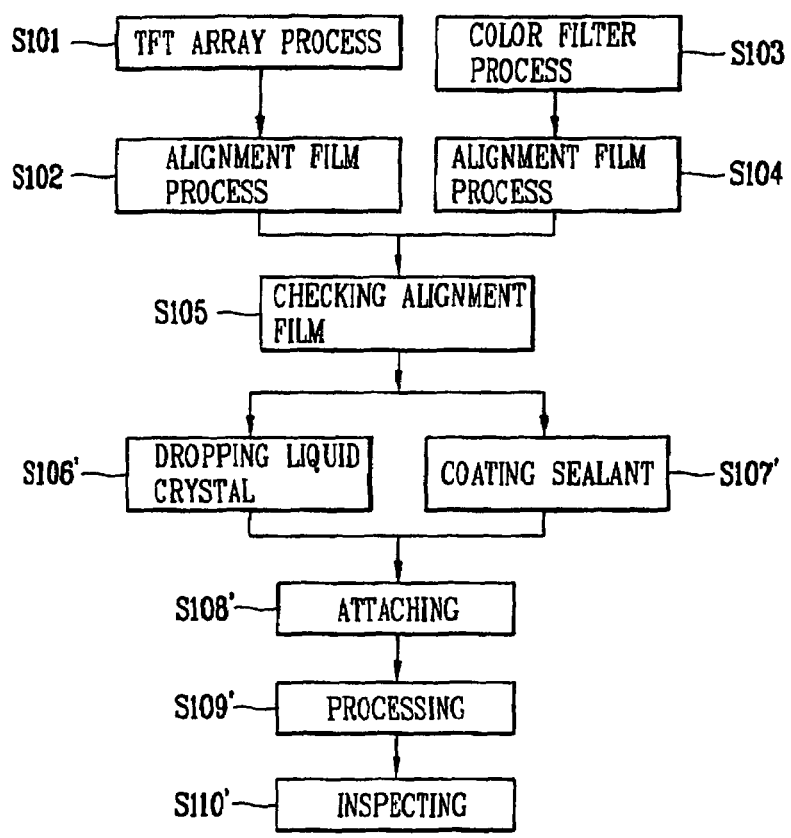
FIG. 7 is a flow chart illustrating the processes of another method for fabricating a liquid crystal display panel in accordance with the present invention.

FIG. 6 is a flow chart illustrating the processes of one method for fabricating a liquid crystal display panel in accordance with the present invention. FIG. 7 is a flow chart illustrating the processes of another method for fabricating a liquid crystal display panel in accordance with the present invention.

Specifically, FIG. 6 illustrates a method for fabricating an LCD in which a liquid crystal layer is formed by a liquid crystal injection method and FIG. 7 illustrates a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT, a switching device, is formed to be connected with the gate lines and the data lines at each of the pixel regions through the array process (step S101). In addition, a pixel electrode which is connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step S103).

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step S102 and S104).

If the model of the liquid crystal display panel is changed so the current rubbing roll needs to be replaced by a different type of rubbing roll or if the current rubbing roll has been abraded so it needs to be replaced with a new rubbing roll, one of rubbing rolls kept in the roll stocker can be taken out for replacement and the rubbing process is continued. This will be described in detail as follows.

Figure 8:
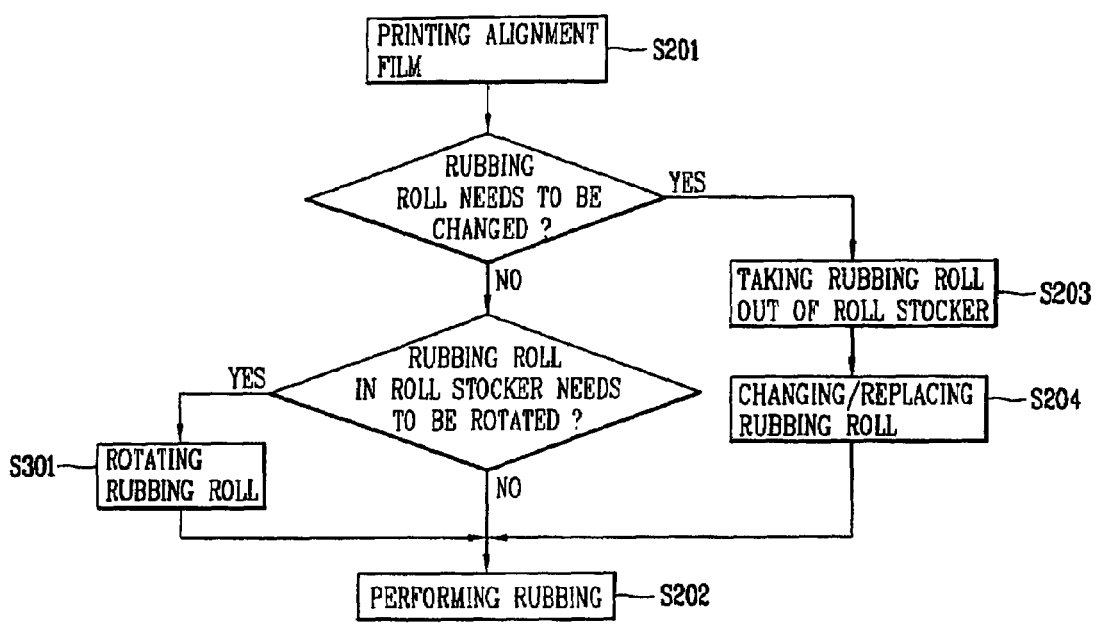
FIG. 8 is a flow chart illustrating the processes of a method for forming an alignment film in the method for fabricating the liquid crystal display panel in FIGS. 6 and 7 in accordance with the present invention.

FIG. 8 is a flow chart illustrating the processes of a method for forming an alignment film in the method for fabricating the liquid crystal display panel in FIGS. 6 and 7 in accordance with the present invention.

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

First, an alignment film is printed on each of the upper and lower substrates which have been fabricated through the above-stated array process and the color filter process, and then rubbed to provide the anchoring force or the surface fixing force (namely, the pretilt angle and the alignment direction) to the liquid crystal molecules of the liquid crystal layer formed between the upper and lower substrates (steps S201 and S202).

In this case, the rubbing process refers to a process for arranging a fired alignment film in a certain direction so that liquid crystals can be arranged in a certain direction by a rubbing cloth.

When the surface of the alignment film is rubbed, the surface of the alignment film has fine recesses.

As the rubbing cloth, a soft cloth is used, and the basic part of setting conditions for the rubbing process is setting a rubbing condition with a suitable strength and applying a uniform rubbing strength on a large area.

The rubbing cloth is formed such that the weft and the warp thread cross finely, and the surface of the rubbing cloth can be damaged by a pattern formed on the substrate or debris while the surfaces of the plurality of substrates are being rubbed.

Thus, when the alignment film is not uniformly rubbed, an alignment degree of liquid crystal molecules is not uniform spatially, resulting in a defective alignment film with optical characteristics partially different.

A method for inspecting the rubbing deficiency includes a first inspecting process in which whether the coated alignment film has a blur, a strip or a pin hole on its surface or not, and a second inspecting process in which uniformity of the surface of the rubbed alignment film is checked and whether the surface of the rubbed alignment film has a scratch or not.

While the rubbing process is being performed, if the rubbing roll has been abraded so as to be replaced with a new one or if the model of the liquid crystal display panel is changed so a different type of rubbing roll is required, a required rubbing roll is taken from the roll stocker to replace the current rubbing roll, and then, the rubbing process is continued (steps S203 and S204).

As described above, in order to take a certain rubbing roll out of the roll stocker, the rotational shaft and the plurality of pairs of roll fixing units are rotated so that the required rubbing roll can be positioned toward the roll entrance. Thereafter, the pair of roll fixing units positioned at both ends of the rubbing roll is pulled in both outward directions, and then, the required rubbing roll is taken out through the roll entrance. For reference, when a certain rubbing roll is laid at the roll entrance to keep it in storage in the roll stocker, the rotational shaft and the plurality pairs of roll fixing units are rotated so that a pair of left and right empty roll fixing units can be directed to the roll entrance. Then, the pair of roll fixing units are pulled in both outward directions, and when the rubbing roll is positioned there between, the pair of roll fixing units which has been pulled return to their origination positions to fix both ends of the rubbing roll so as to be kept in storage.

When the rubbing roll in the roll stocker needs to be rotated in order to prevent sagging of the rubbing roll kept in the roll stocker, the motor provided at the roll stocker is driven. The driving power of the motor is transferred along the belt to rotate the shaft, and in this case, because the shaft connection part whose center is fixed at the rotational shaft is connected with the rotational shaft, when the rotational shaft is rotated, the shaft connection part is also rotated, and accordingly, the roll fixing unit connected with the end of the shaft connection part and the rubbing roll are also rotated (step S301).

After the rubbing process is finished, the upper and lower substrates are subjected to an inspection process through an alignment film inspecting device as to whether their alignment films are defective or not as illustrated in FIGS. 6 and 7 (step S105).

As the alignment film inspecting device, a steam inspecting device can be used, which will be described in detail as follows.

In this embodiment of the present invention, the steam inspecting device includes a steam generator. The side of the mother substrate where the alignment film is formed is exposed to the steam generator so as to be steamed up, and then, non-uniformity such as a color change, a light and shade difference or formed waterdrops are observed through an observation equipment to thereby inspect uniformity of the alignment film. In this manner, the steam inspecting device in this embodiment performs the inspecting, so the inspecting process is simple and the process yield can be improved because the substrate is not damaged.

The inspecting of the alignment film using the steam inspecting device is performed in the following order.

First, the alignment film-formed substrate is positioned on the steam generator. In this case, the mother substrate is installed to be slanted at a certain angle, e.g., at about 40°~50°, toward the steam generator to facilitate steaming up and its observation.

The steam generator heats distilled water at a certain temperature, e.g., at about 80° C.~100° C. to generate steam to make the alignment film fog up. Then, the steamed mother substrate is observed from the opposite side with the naked eyes or using the observation equipment, for example, a camera unit or the like, to observe non-uniformity such as a color change, a light and shade difference or formation of waterdrops, to thus check uniformity of the alignment film.

Through the inspecting, a fine defect or contamination by an impurity of the alignment film can be also checked. The above descriptions take the example of the case where the inspecting is performed after the rubbing process, but the inspecting can be performed before the rubbing process.

After the inspecting of the alignment film is finished, as illustrated in FIG. 6, spacers for uniformly maintaining a cell gap are formed on the lower substrate and a sealant is coated on an outer edge of the upper substrate. And then, the lower and upper substrates are attached by applying a pressure thereto (steps S106-S108). In this case, the spacers can be ball spacers according to a spreading method, or can be columnar spacers formed through patterning.

The lower and upper substrates are formed as large-scale glass substrates. In other words, a plurality of panel regions are formed on the large-scale glass substrates, and the TFT, the switching device, and the color filter layer are formed at each panel region. Thus, in order to obtain a unit liquid crystal display panel, the glass substrates are to be cut and processed (step S109). Thereafter, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps S110 and S111).

The liquid crystal is injected using a vacuum injection method using a pressure difference. That is, according to the vacuum injection method, the liquid crystal injection opening of the unit liquid crystal display panel separated from the large-scale mother substrates is put in a container filled with liquid crystal in a chamber with a certain degree of vacuum, and then, the degree of vacuum is changed to allow liquid crystal to be injected into the liquid crystal display panel according to a pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem.

That is, first, it takes much time to fill the liquid crystal in the liquid crystal display panel. In general, since the attached liquid crystal display panel has an area of hundreds of $cm^2$ and a gap of merely about a few μm, the amount of injected liquid crystal per unit hour is inevitably small when the vacuum injection method using the pressure difference is employed. For example, about 8 hours are required for filling liquid crystal for fabricating an about 15-inch liquid crystal display panel. That is, since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared with the amount of liquid crystal filled in the container, and when liquid crystal is exposed in the air or exposed to a specific gas, it is reacted to the gas and degraded. Thus, although the liquid crystal filled in the container is filled in the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, recently, the dropping method is increasingly employed.

As illustrated in FIG. 7, in case of using the dropping method, after the alignment film is inspected (step S105), a certain seal pattern is formed with a sealant on the color filter substrate and, at the same time, a liquid crystal layer is formed on the array substrate (steps S106' and S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, in the case where the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, there is no increase in the unit cost of the liquid crystal display panel from discarding of the high-priced liquid crystal as in the vacuum injection method. Thus, the price competitiveness of the product can be enhanced.

Thereafter, in a state that the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps S109' and S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A roll stocker for keeping rubbing rolls and for arranging an alignment film of an liquid crystal display panel comprising:
   a plurality of pairs of roll fixing units for fixing a plurality of rubbing rolls, wherein both ends of each of the rubbing rolls are inserted to be fixed on the pair of roll fixing units;
   a pair of shaft connection parts each having a first portion perpendicular to the rubbing rolls and a plurality of end portions extending toward and parallel to the rubbing rolls and connected with each end of the plurality of pairs of roll fixing units;
   a rotational shaft, wherein the center of the pair of shaft connection parts is fixed at the rotational shaft and the rotational shaft rotates the pair of shaft connection parts;
   a roll entrance under some pairs of the roll fixing units for allowing the rubbing rolls to be received and taken out; and
   an outer frame covering the plurality of pairs of roll fixing units, the pair of shaft connection parts and the rotational shaft so as to be closed from outside.

2. The roll stocker of claim 1, further comprising: a driving unit for rotating the rotational shaft.

3. The roll stocker of claim 2, wherein the driving unit comprises a motor.

4. The roll stocker of claim 3, further comprising: a driving transmission unit for transferring power of the motor to the rotational shaft using a belt.

5. The roll stocker of claim 4, wherein the driving transmission unit comprises a shaft.

6. The roll stocker of claim 4, wherein the belt is connected with the rotational shaft and transfers power to the rotational shaft, and the plurality of rubbing rolls kept in storage are rotated according to rotation of the rotational shaft.

7. The roll stocker of claim 1, wherein when the rubbing roll is placed at the roll entrance, the rotational shaft and the plurality of pairs of roll fixing units are rotated so that a pair of an empty roll fixing units can be directed to the roll entrance.

8. The roll stocker of claim 7, wherein the pair of roll fixing units are pulled in both outward directions, the rubbing roll is positioned therebetween, and the pair of roll fixing units return to their original position for fixing both ends of the rubbing roll.

9. The roll stocker of claim 1, wherein the rubbing roll is kept in storage in a horizontal direction in the roll stocker.

* * * * *